United States Patent [19]

Horikoshi et al.

[11] Patent Number: 4,911,950
[45] Date of Patent: Mar. 27, 1990

[54] METHOD OF SMOOTHING MAGNETIC FILM

[75] Inventors: Tsunenobu Horikoshi, Hirakata; Satoshi Hirose, Amagasaki; Kazunori Sakamoto, Katano, all of Japan

[73] Assignee: Matsushita Electric Industrial Co., Ltd., Osaka, Japan

[21] Appl. No.: 212,101

[22] Filed: Jun. 27, 1988

Related U.S. Application Data

[63] Continuation of Ser. No. 67,251, Jun. 26, 1987, abandoned.

[30] Foreign Application Priority Data

Jun. 30, 1986 [JP] Japan .................. 61-153141
Jun. 30, 1986 [JP] Japan .................. 61-153142

[51] Int. Cl.⁴ .................................... H01F 10/02
[52] U.S. Cl. ............................. 427/48; 427/128; 427/130
[58] Field of Search .................. 427/48, 128, 130

[56] References Cited

U.S. PATENT DOCUMENTS

| | | | |
|---|---|---|---|
| 3,001,891 | 9/1961 | Stoller | 117/93 |
| 3,256,112 | 6/1966 | Camras | 427/48 K |
| 3,518,109 | 6/1970 | Halley | 117/93.2 |
| 3,928,657 | 12/1975 | Armstrong | 427/47 |
| 4,336,278 | 6/1982 | Pertzsch et al. | 427/48 |
| 4,547,393 | 10/1985 | Asai et al. | 427/130 K |

Primary Examiner—Bernard Pianalto
Attorney, Agent, or Firm—Spencer & Frank

[57] ABSTRACT

This invention provides a method of smoothing a magnetic film comprising the steps of: coating a magnetic paint over the surface of a web to form a film thereon; and moving the web in an alternating current magnetic field before the film thereon being dried so that smoothing of the film may be effected. This method causes fluctuation of the magnetic particulates contained in the paint so as to uniformly reduce the viscosity of the film, thereby preventing the formation of a high-viscosity layer on the film surface. Accordingly, the surface of the film can be easily smoothed by means of either an air doctor or a flexible sheet.

1 Claim, 2 Drawing Sheets

METHOD OF SMOOTHING MAGNETIC FILM

This application is a continuation of application Ser. No. 067,251, filed June 26, 1987, now abandoned.

BACKGROUND OF THE INVENTION

1. Field of the Invention

The present invention relates to the manufacture of a magnetic recording medium which is typically used in the form of a magnetic recording tape, a floppy disc or the like, and more particularly to a method of smoothing magnetic films.

2. Description of the Prior Art

It is known that a web may be coated with a coating material while it is being moved, thereby forming a film over the surface of the web. In general, the thus-formed film is subjected to a smoothing process in order to make the surface of the film smooth and uniform. In the field of manufacture of magnetic recording media such as magnetic tapes and floppy discs, various processes for smoothing magnetic films are practiced in order to improve the performance of such media.

A method in which a coated film is smoothed by contacting a doctor bar or a doctor knife to the surface of the film and in direct contact therewith has heretofore been widely used as a typical smoothing process, as disclosed in Japanese Patent Examined Publication No. 11336/1973. However, such a prior-art process involves disadvantage in that scratches or other defects are easily formed due to air movement or foreign matter which might have an influence during the contacting movement between such doctor element and the film and in that, since a web vibrates with respect to the doctor bar or doctor knife which is disposed in a fixed manner, the film formed on the web is likely to vary in thickness.

A film-smoothing method employing an air doctor is known as a method which does not involve such disadvantages to any substantial extent. This method has heretofore been utilized in smoothing a film formed by a coating paint having relatively low viscosity. Such a method is carried out in the following manner. A magnetic paint is coated on a web and a film is thus formed thereon. Before the film dries and solidifies, the wet film is supported and moved on a supporting roll and at the same time air is blown onto the film by means of an air doctor. The film is smoothed by the pressure of the air.

In another conventional method, while the film is being moved, a flexible film sheet is brought into contact with the surface of the film so as to smooth the latter, as disclosed in Japanese Patent Unexamined Publication No. 53631/1974. This method enables various improvements in erasure of cyclic unevenness in thickness, twill-like patterns and longitudinal stripes in reverse roll coating, as well as erasure of plate cylinder patterns in gravure roll coating. This brings about a significant improvement in the coated state of the film. Typically, in such a method, a magnetic paint is coated on a web while the latter is being moved, and a film is formed over the web. Before the film dries and solidifies, the surface of a flexible sheet is brought into contact with the wet film, the flexible sheet being secured at its one end to a fixed bar. Thus, the film is made smooth and uniform by the shear stress produced between the surface and the web.

In such a prior-art method, the air doctor has a significant effect in smoothing films formed of low-viscosity magnetic paint. It is, however, inferior with respect to magnetic paint having relatively high viscosity; for example, mottled patterns may be formed on the film.

Also, the aforesaid smoothing method employing a flexible sheet has advantage in that, since the sheet the ability to move in correspondence with the vibration which might occur during movement of the web, it is possible to reduce variations in film thickness. In general, this smoothing process is effective with respect to low-viscosity magnetic paint. However, since a magnetic paint containing fine grain magnetic particulates is commonly used for a magnetic recording medium of the type suitable for high-density recording, the viscosity of the paint per se is increased. It is therefore difficult for any of the prior-art methods to meet the demand for high-precision smoothness of such a film.

Such difficulty is typically derived from the fact that a magnetic paint of the aforementioned type exhibits large thixotropic properties, that is, exhibits large variations in viscosity in response to shearing; for example, the viscosity is reduced by imparting shear stress to the paint and also, if the shear stress is eliminated, the paint recovers its viscosity relatively quickly. Therefore, the paint coated on a web may be reduced in viscosity at the time that shear stress is imparted to the web during a coating process. However, the paint recovers its viscosity by virtue of its thixotropic properties before the smoothing step is effected following the coating step. In addition, since, after the coating, a diluting solvent evaporates from the film extremely quickly, another layer having relatively high viscosity is formed on the surface of the film. Accordingly, in this state, when air is blown onto the film through the nozzle of the air doctor, the surface layer having relatively high viscosity is partially broken, thereby producing small clumps. This constitutes a cause of formation of mottled patterns on the film. In order to prevent this phenomenon, consideration has been given to increasing the level of the air pressure of the air doctor. However, this measure produces no significant effect upon the occurrence of this phenomenon; rather, the increased air pressure may cause scattering of the paint which forms the film. The scattered paint may stick to the film, and this could result in lowering of the quality of smoothness.

Also, in a state wherein the aforesaid layer with relatively high viscosity is formed, if the flexible sheet is brought into contact with the web, the layer is subjected to shear stress between the web and the flexible sheet and thus its viscosity starts to decrease. However, before the viscosity of the film is reduced to a relatively low level uniformly in the direction of its thickness, the film passes by an associated edge of the flexible sheet. It is therefore impossible to obtain a uniform smoothing effect, and this may also result in the occurrence of longitudinal stripes, uneven thickness or mottled patterns.

SUMMARY OF THE INVENTION

It is therefore an object of the present invention o provide a method of smoothing a magnetic film which enables an improved smoothing process without unevenness in coating.

It is another object of the present invention to provide a method in which the surface of a film formed of a magnetic paint having high viscosity suitable for high-density recording can be effectively smoothed by means of a typical air doctor method.

It is still another object of the present invention to provide a method in which the surface of a film formed of a magnetic paint having high viscosity suitable for high-density recording can be effectively smoothed by means of a typical flexible sheet.

To these end, the present invention provides a method of smoothing a magnetic film comprising the steps of:

coating a magnetic paint over the surface of a web to form a film thereon; and moving the web in an alternating current magnetic field before the film thereon is dried so that smoothing of the film may be effected.

In accordance with the present invention, the aforesaid process causes fluctuation of the magnetic particulates contained in the paint so as to uniformly reduce the viscosity of the film, thereby preventing the formation of a high-viscosity layer on the film surface. Accordingly, the surface of the film can be easily smoothed by means of either an air doctor or a flexible sheet.

More specifically, when an alternating current magnetic field is caused to act upon the magnetic paint, the magnetic particulates contained in the latter are fluctuated by the interaction between the magnetic field and the magnetic momentums of the individual magnetic particulates. In a magnetic field having nonuniform magnetic flux density, the magnetic particulates are generally moved toward a large magnetic flux density concurrently with its rotary motion. Accordingly, if a wet film which does neither dry nor solidify is moved transversely of an alternating current magnetic field showing the distribution of magnetic flux density in the direction of thickness of the film, a kind of spiral flow of magnetic paint is produced in a cross-sectional area of the film. This flow of the magnetic paint caused by the alternating current magnetic field imparts a shearing force to the wet film in the form of a kind of agitation. Thus, the viscosity of the film is uniformly reduced in the directions of its thickness and width and also the high-viscosity layer is prevented from being formed over the surface of the film. This enables the film surface to be uniformly smoothed by means of the air doctor or the flexible sheet.

It has heretofore been unknown that smoothing may be effected by the action of an alternating current magnetic field in the aforesaid manner. U.S. Pat. No. 4,547,393 discloses a surface treatment employing a smoothing sheet in which the smoothing sheet is subjected to a direct current magnetic field for a magnetic-field orientation treatment so that the orientation of planar magnetic particulates is improved. As previously described, the method of this invention is capable of achieving an improved smoothing effect by generating a spiral flow of magnetic paint in the direction of thickness of the film by means of an alternating current magnetic field. Accordingly, it will be appreciated that the objects, features and arrangement of the invention differ from those of the method described in the specification of U.S. Pat. No. 4,547,393.

DESCRIPTION OF THE PREFERRED EMBODIMENTS

Preferred embodiments of the invention will be described below with reference to the accompanying drawings.

It is to be noted that an alternating-current magnetic field generator used in the invention need not necessarily include an electro-magnet having a special structure. It is therefore possible to employ any generator of the type in which a non-uniform magnetic field can be applied in the direction of thickness of the film formed on a web, but it is preferable to produce a magnetic field as uniformly as possible in the direction of the width of the web. It is also preferred that the frequency and intensity of the alternating current magnetic field employed are suitably selected in accordance with the characteristics of a magnetic paint employed and the state of a film.

EXAMPLE 1

Figure 1:
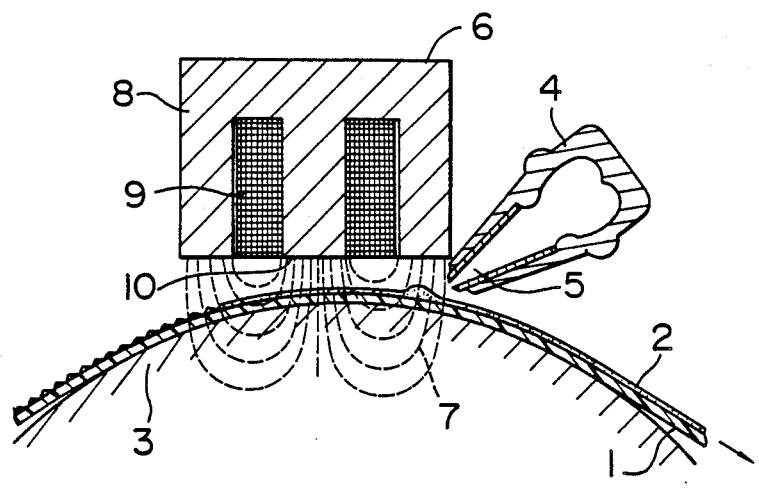
FIG. 1 is a schematic view of a first preferred embodiment of the present invention and shows a method of smoothing a magnetic film by means of an air doctor.

As shown in FIG. 1, a web 1 composed of a polyester film having a width of 300 mm was moved in a running direction at a speed of 100 m/min, and a magnetic coating material having a viscosity of about 10 poise was coated over the moving web 1 by a reverse-roll method, thereby forming a film 2 having a thickness of 16 $\mu$m. The magnetic paint was obtained by uniformly dispersing $\gamma$-iron oxide powder and non-magnetic pigment in a mixed solution containing methyl ethyl ketone, xylole and a copolymer of vinyl chloride and vinyl acetate. A core 8 had a length of 400 mm, a width of 100 mm and a thickness of 70 mm as well as an E-shaped form in crosssection perpendicular to the length of the core 8, as shown in FIG. 1. A coil 9 was wrapped around such a core 8 to form an electro-magnet 6, and was disposed such that its length was arranged at right angles with the direction of movement of the web 1. An alternating current was made to flow in the electro-magnet 6 at a frequency of 60 Hz, and an alternating current magnetic field of about 1000 gauss was created with the pole face 10 separated from the web 1 by a distance of about 10 mm. In addition, an air doctor 4 having a nozzle width of 0.5 mm was disposed such that the distance between the tip of a nozzle 5 and the adjacent surface of the film 2 was 4 mm and the direction of air blowing was inclined at an angle of about 45 degrees with respect to the surface of the film 2. Before the film 2 dried and solidified, that is, while it was in a non-dry state, the web 1 was moved in an alternating current magnetic field 7 as the former was supported on a supporting roll 3. In this state, air was blown through the air nozzle at an air pressure of about 0.1 kg/cm$^2$, thereby effecting smoothing. In this case, it is preferable that the supporting roll 3 is made of a non-magnetic material having high electrical resistance owing to the fact that such a material does not heat and that a magnetic field can be effectively adjusted. In addition, prior-art methods such as orientation treatment, drying, solidification, calendering and cutting were conducted, thereby preparing a video tape. No cyclical unevenness in thickness, mottled patterns and longitudinal stripes were found on the thus-obtained video tape, and a high degree of gloss of the tape was achieved. In addition, such video tape exhibited superior characteristics in relation to S/N ratio and the occurrence of dropouts.

EXAMPLE 2

Instead of the reverse roll coating method used in Example 1, coating was effected by a gravure coating method, and a smoothing treatment similar to that performed in Example 1 was carried out under the conditions that the intensity of the magnetic field was 1500 gauss with the air pressure of the air doctor being 0.15 kg/cm$^2$. The thus-obtained film had no gravure cylindrical plate patterns, and no unevenness in coating, mottled patterns, longitudinal stripes were found thereon. In consequence, a high degree of gloss was achieved and it was therefore possible to obtain a video tape superior in characteristics relative to S/N ratio and the occurrence of dropouts.

EXAMPLE 3

Figure 2:
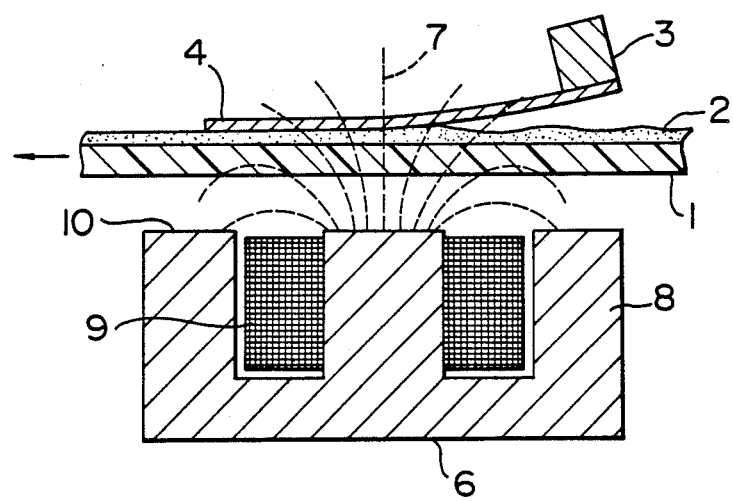
FIG. 2 is a schematic view of a second preferred embodiment of the present invention and shows a method of smoothing a magnetic film by means of a flexible sheet.

As shown in FIG. 2, in the same manner as that of Example 1, the web 1 composed of a polyester film having a width of 300 mm was moved at a speed of 100 m/min, and a magnetic paint with a viscosity of about 10 poise was coated over the moving web 1 by a reverse-roll method, thereby forming the film 2 having a thickness of 16 μm in its wet state. The magnetic paint was obtained by uniformly dispersing γ-iron oxide powder and non-magnetic pigment in a mixed solution containing methyl ethyl ketone, xylole and a copolymer of vinyl chloride and vinyl acetate. The core 8 had a length of 400 mm, a width of 100 mm and a thickness of 70 mm as well as an E-shaped form in cross-section taken in the direction perpendicular to the length of the core 8, as shown in FIG. 2. The coil 9 was wrapped around the core 8 to form the electromagnet 6, and was disposed such that its longitudinal direction was arranged at right angles with the direction of movement of the web 1. An alternating current was made to flow in the electro-magnet 6 at a frequency of 60 Hz cycles per second, and an alternating current magnetic field of about 1000 gauss was created with the pole face 10 separated from the web 1 by a distance of about 10 mm. In addition, a flexible sheet 4 made of a polyester film having a width of 300 mm and a thickness of 25 μm was disposed such that the flexible sheet 4 was maintained in contact with the film through a length of 50 mm. The wet film 2 which did not dry nor solidify was moved in an alternating current magnetic field 7, and the flexible sheet 4 was brought into contact with the wet film 2, thereby effecting smoothing. In addition, various prior-art methods such as orientation treatment, drying, solidification, calendering and cutting were conducted, thereby preparing a video tape. No unevenness in coating, mottled patterns and longitudinal stripes were found on the thus-obtained video tape, and the tape had a uniform and smooth film surface. In addition, such tape had superior characteristics relative to S/N ratio and the occurrence of dropouts.

EXAMPLE 4

Instead of the reverse roll coating method used in Example 3, coating was effected by a gravure coating method, and a smoothing treatment similar to that performed in the aforesaid Example 3 was carried out under similar conditions. The thus-obtained film had no gravure cylindrical plate pattern, and no unevenness in coating, mottled patterns, longitudinal stripes was found thereon. In consequence, it was possible to obtain a video tape superior in characteristics relative to S/N ratio and the occurrence of dropouts.

The results of S/N ratios and dropouts obtained in the above-described Examples 1 to 4 are shown collectively in the following table. It is to be noted that the S/N ratio is the relative value with respect to "0" representative of a typical S/N ratio realized in the prior-art method.

TABLE

|  | Example 1 | Example 2 | Example 3 | Example 4 | Prior Art |
|---|---|---|---|---|---|
| S/N (db) (Y signal) | 0.5 to 1.0 | 0.5 to 1.0 | 0.5 to 1.0 | 0.5 to 1.0 | 0.00 |
| Number of Dropouts per minute Depth: 16 db Width: 15 us | 5 to 10 | 5 to 10 | 5 to 10 | 5 to 10 | 10 to 15 |

Figure 3:
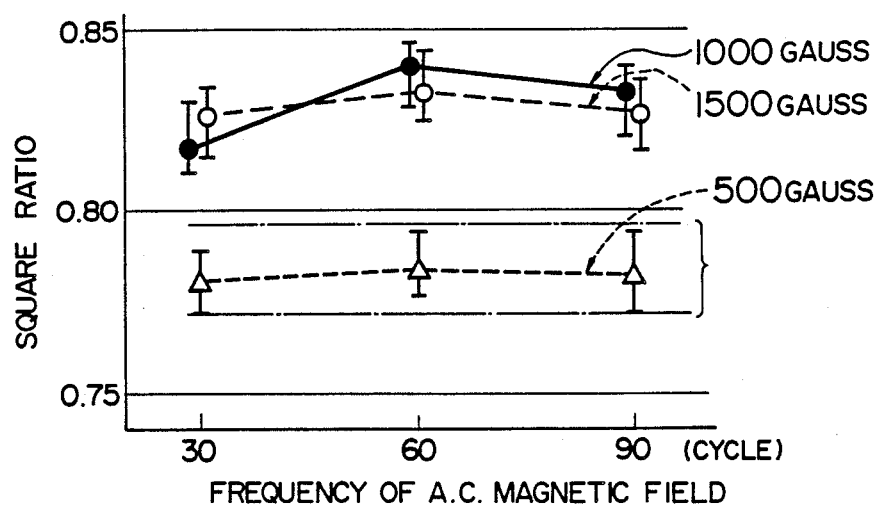
FIG. 3 is a graph showing the relationships between the frequency of an applied alternating current magnetic field, the intensity thereof and the squareloop ratio of obtained magnetic films, for a parameter of the intensity of the magnetic field.

FIG. 3 is a graph showing the influence of the frequency and intensity of an alternating current magnetic field and shows the square-loop ratios of the obtained magnetic film where the frequency is varied in the steps of 30, 60 and 90 Hz with the intensity of the magnetic field being changed in the steps of 500, 1000 and 1500 gauss. The distribution in each of Examples 1 to 4 is as shown in FIG. 3, and no difference is observed between the respective cases where the air doctor and the flexible sheet are employed. As can be seen from FIG. 3, no significant effect is produced when the intensity of magnetic field is approximately 500 gauss. However, when the intensity becomes 1000 or more gauss, a large effect can be obtained.

It is to be noted that, although the intensity of the magnetic field has no particular upper limit, an excessive intensity of magnetic field may lead to an increase in the overall size of the apparatus. In practice, therefore, about 1000 to 2000 gauss is preferable.

As described above, the present invention provides a method of smoothing a film comprising the steps of: coating a magnetic paint over the surface of a web to form a film thereon; and moving the web having the film thereon in a non-dry state in an alternating current magnetic field so that the viscosity of the wet film is reduced, thereby effecting smoothing of the film by means of an air doctor or a flexible sheet. Since this provides a film having a surface with a high accuracy of smoothness, the method of the invention is remarkably effective in improving the characteristics of various types of magnetic tape.

As a matter of course, the present invention is not confined solely to the arrangements used in the respective Examples 1 to 4. It will be appreciated that, even in a case where the speed of coating is changed or where another type of doctor blade is employed, it is possible to achieve an effect similar to that of the present Examples by suitably selecting the intensity and frequency of the alternating current magnetic field.

What is claimed is:

1. A method of producing a magnetic recording medium having a high density, comprising the steps of:
   coating a magnetic paint containing magnetic particles over the surface of a web to form a wet film thereon;

moving said web in a running direction, said web having widthwise and thickness directions extending perpendicular to each other and to said running direction;

generating an alternating current magnetic field, said alternating current magnetic field being generated by a magnetic core having a length extending in the widthwise direction of said web and being positioned on only one side of said web, the length of said magnetic core being greater than the width of said web, said alternating current magnetic field having an intensity greater than 1,000 gauss and a frequency in the range from about 30 to about 90 Hz, and being applied to said web substantially uniformly in the thickness direction thereof;

drying said film in said alternating current magnetic field;

smoothing the surface of said magnetic film by one of an air doctor and a flexible sheet;

subjecting said film to magnetic orientation; and solidifying said film by drying, whereby said alternating current magnetic field agitates said magnetic particles thereby creating a spiral flow of said magnetic paint and thus uniformly reducing the viscosity of said magnetic film and facilitating the smoothing of said film.

* * * * *